Sept. 10, 1946.   V. V. MASON   2,407,314
FASTENING DEVICE AND MANUFACTURE THEREOF
Filed Sept. 24, 1943
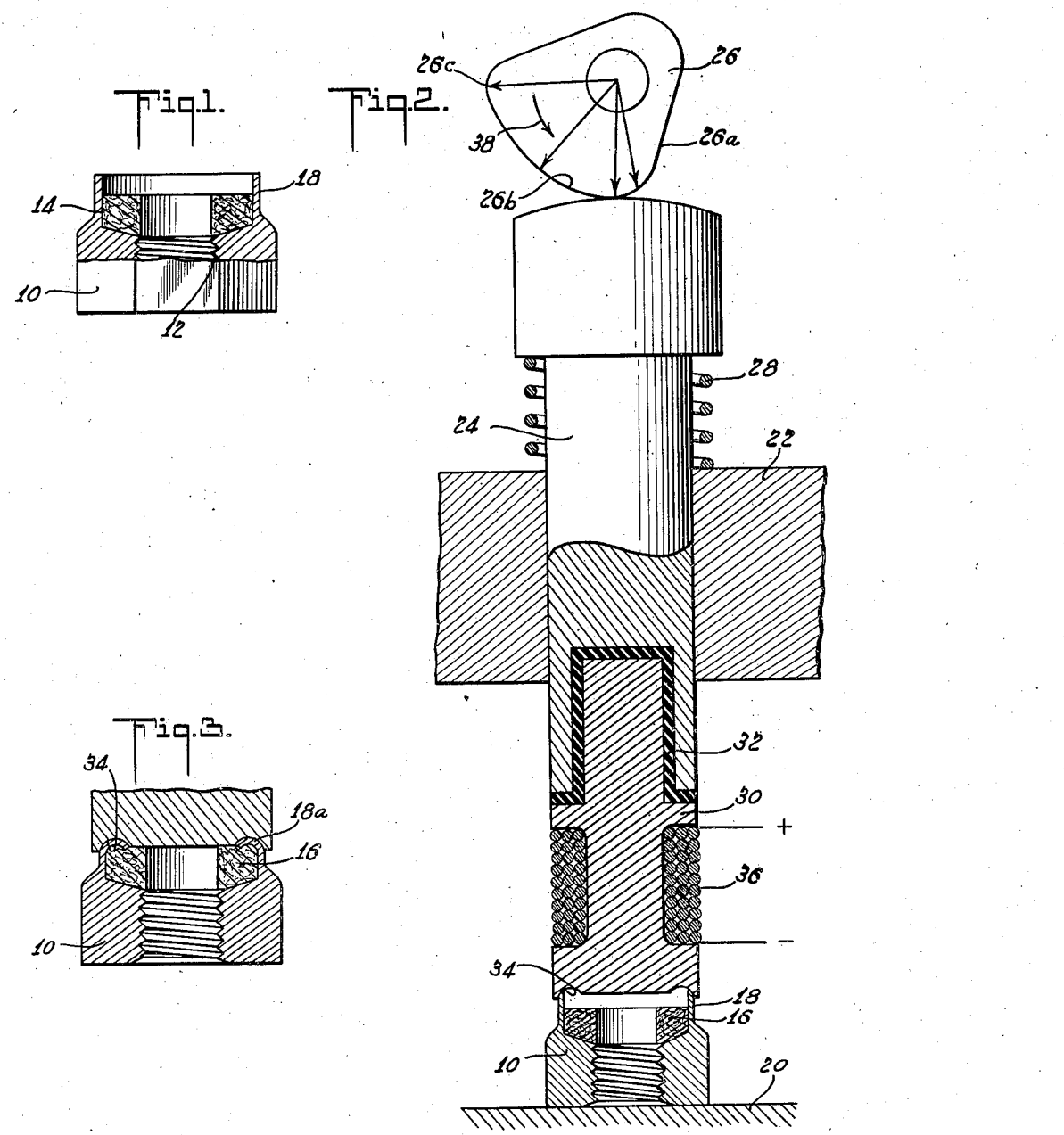

Patented Sept. 10, 1946

2,407,314

UNITED STATES PATENT OFFICE 2,407,314

FASTENING DEVICE AND MANUFACTURE THEREOF

Veyne V. Mason, Scotch Plains, N. J., assignor to Elastic Stop Nut Corporation of America, Union, N. J., a corporation of New Jersey Application September 24, 1943, Serial No. 503,639

2 Claims. (Cl. 10—86)

The present invention relates to fastening devices and the manufacture thereof and has particular reference to screw threaded fastening devices. Still more particularly the invention relates to self-locking screw threaded devices, specifically nuts, and still more particularly to such devices made from light weight metal, more particularly magnesium.

Since the invention is particularly applicable to self-locking nuts and the manufacture thereof it will be hereinafter described and illustrated, by way of example but without limitation, to such articles.

Self-locking nuts, particularly those of the kind in which a locking insert held in the body of the nut to be engaged by a bolt or stud after the latter has passed through the threaded bore of the nut, are very extensively used in installations such as in aircraft where weight is a factor of major importance and where it is desirable to employ nuts having the least possible weight while at the same time affording sufficient strength for the intended use. To this end large quantities of such nuts manufactured of aluminum or aluminum alloy have been made and installed. However, aluminum is not the lightest metal commercially available having sufficient strength for many of the installations where self-locking nuts are employed in large quantities in aircraft and other uses where lightness of weight is a paramount factor.

Magnesium is very substantially lighter than aluminum, the specific gravities of the two metals being 1.74 and 2.70, respectively, and from a strength standpoint magnesium is suitable for many desired applications.

Heretofore, however, magnesium has not been practically useable in the manufacture of self-locking nuts or other devices of the kind in which locking inserts are fixed in the nut body, the reason for this being that the structure of the metal does not permit of the deformation of the nut body in the manner and under the conditions required to produce such devices at prices making them commercially useable.

The most satisfactory form of self-locking device which utilizes a locking insert is the form in which the locking insert is of compressed cellulose fibre (usually referred to as vulcanized fibre) or other known non-metallic, elastic and relatively soft material in which a thread is impressed by the bolt passing through the device. It is characteristic of the materials which have so far been found to be most satisfactory that they will not withstand without serious deterioration or destruction, temperatures of the order required for hot forging or equivalent hot working of the metal of the body in which they are inserted. Consequently, the assembly of such devices has uniformly been accomplished by cold working methods, which in the case of devices of the kind under consideration involves the provision of a body having an insert receiving well or recess, the rim of which is crimped or otherwise deformed after the insert is placed in the well to provide a rim or flange overlying the insert to hold it against either axial or rotational displacement in the body.

Because of considerations of cost of manufacture it has been found that the most desirable and commercially most feasible method of assembling most sizes of nuts is by a punch press operation for deforming the metal to provide the retaining rim and this operation is in practice substantially always carried out in a high speed punch press.

While punch press assembling methods have proved to be commercially satisfactory for devices made of steel, brass, aluminum and various alloys thereof it has heretofore been found to be impossible to make like products by the methods now in use when the material of the body of the device is magnesium or alloys thereof, the composition of which is such that the metal may be said to consist essentially of magnesium. With reference to such alloys the following may be cited as examples of present commercially available materials which together with others of analogous nature are to be considered in so far as this invention is concerned as being metal which is essentially magnesium, the material for which the analyses given below being designated by the nomenclature commonly used in the trade.

| | Magnesium "J" | Magnesium "O" |
|---|---|---|
| Manganese | 0.2 | 0.2 |
| Zinc | 0.7 | 0.7 |
| Aluminum | 6.5 | 8.5 |
| Magnesium | 92.6 | 90.8 |
| Specific gravity | 1.80 | 1.80 |

The present invention has therefore as its general object the product of devices of the character described made of metal which is essentially magnesium or of metal having like properties, by methods and means which will hereinafter be more particularly described and illustrated by way of example but without limitation as applied to a self-locking nut and the manufacture thereof.

Such material, which is essentially magnesium, is known to have the characteristic of being sensitive to work hardening by which, as the result of metal working operations, the material becomes brittle and will break in response to the application of sufficient force to further work the metal, as distinct from such materials as aluminum which has a high resistance to work hardening and which may be repeatedly cold worked without the development of such work hardening.

Therefore, it is a further object of this invention to provide a device of the type set forth and a method of forming such a device which, although formed of light weight material having a high degree of susceptibility to work hardening, may nevertheless be formed in a practical expedient manner without danger of fracture and spoilage.

In the accompanying drawing;

Fig. 1 is an elevation, partially in section, of a semi-finished hexagonal self-locking nut of the kind ordinarily referred to as an elastic stop nut;

Fig. 2 is a diagrammatic view showing apparatus adapted to complete the assembly of the nut shown in Fig. 1 according to the present invention; and Fig. 3 is a fragmentary view showing the parts of Fig. 2 in a different position after the assembly has been completed.

Referring now more particularly to Fig. 1 the article shown comprises a nut body 10 of metal which is essentially magnesium and which in the example shown is of the usual hexagonal external configuration. The body 10 is provided with a recess or well 14 for the reception of a locking insert 16 of suitable elastic material, advantageously compressed laminated fibre or the like. The upper part of the body 10 is turned externally to circular shape to provide a relatively thin rim 18 projecting above the insert 16 and adapted to be closed over the top of the latter to lock it in place.

The body 10 may be formed in any suitable fashion but will ordinarily be produced by the usual automatic screw machine methods since the nature of the material commercially available makes machining methods substantially the only methods available. The reason for this is that in the present state of the development of the art, magnesium other than cast metal is produced commercially only by extrusion methods, since the nature of the metal results in galling when drawing is attempted and imperfections similar to "hot short" defects in steel when rolling is attempted.

The nature of the extruded magnesium is such that in a cold punching operation the metal will not withstand, without cracking, the quick and severe deformation required to crimp the flange of the nut over the insert to provide a retaining rim, and as has been previously pointed out the inability of the usual locking insert to withstand what are ordinarily considered as hot working temperatures makes ordinary hot forging operations impossible of use.

I have discovered, however, that the application of a remarkably low degree of heat to the material, so low in fact that the operation is essentially a cold working rather than a hot forging operation, so changes the nature of the material that it can be successfully deformed to produce the desired retaining rim, by a rapid punch press operation. The temperature required to successfully effect the desired result is so low, being of the order of as little as 150° Fahrenheit, or even less, with materials which are essentially magnesium and which may for example be of the commercial analyses as given above, that materials for the locking insert which have very low heat resistance without deterioration can successfully be assembled.

Because the amount of heat required to be imparted is so little and further because accurate control of the maximum temperature at which the metal is worked is required in order to insure against overheating the insert, the required heat is in accordance with one phase of the present invention preferably applied to the nut body by conduction from the punch which effects the closing or assembling operation and which is advantageously maintained at a controlled temperature by electric heating means.

In Fig. 2 there is diagrammatically shown an apparatus illustrative of the method of closing contemplated by the present invention. In this figure 20 designates the bed of a punch press or the like and 22 a guide for a plunger 24. The plunger 24 is actuated by a cam 26, the plunger being loaded by spring 28. At its lower end the plunger 24 has secured to it by any suitable means a punch 30 which is advantageously heat insulated from the plunger by means of any suitable form of insulating material as shown in 32. The working face of the punch is provided with an annular suitably curved working face 34 shaped to crimp the flange 18 of the nut body over the insert 16. When the punch descends to its lower terminal position, the flange 18 will be turned over to the position to provide the retaining or locking rim 18a indicated in Fig. 3.

The punch 30 is as previously noted advantageously heated electrically and to this end the embodiment shown is provided with an electrically energized heating coil 36 located in a suitable recess in the body of the punch.

In order to insure heating of the material to the desired degree the punch is advantageously heated to a temperature substantially above that desired to be obtained in the material being deformed, so as to secure relatively rapid flow of heat by conduction from the punch to the rim. At the same time the amount of heat so transferred must be closely controlled, and to this end the punch is advantageously actuated on its downward or working stroke with a motion which provides a dwell period of predetermined length at the point in the stroke when initial contact with the rim has been made and preferably when a slight initial deformation has taken place so as to provide an annular surface contact rather than a line contact between the working face 34 of the punch and the outer edge of the rim 18. Obviously the rim of the blank can be chamfered to fit the contour of the punch and thus avoid initial line contact, but by providing the dwell at a place in the stroke after initial deformation has taken place it is possible to compensate for slight variations within the permissible tolerance limits of the heights of the devices being assembled. It will be appreciated that for mass production articles relatively wide tolerance limits are desirable and since in articles of the character under discussion the exact height of the rim is not critical, extremely close tolerance limits of the rims to be assembled are not necessary for satisfactory commercial production.

The desired character of working stroke may be obtained by any known mechanical motion and by way of illustration this is indicated in Fig. 2 by the form of the cam 26 which rotates in the direction indicated by arrow 38 and is provided with a rise 26a for bringing the punch to the position shown in Fig. 2 where it has just made initial contact with the work and where the punch is permitted to dwell because of the constant radius segment 26b of the cam which follows the rise 26a. The segment 26b is followed by a second rise 26c which operates to effect the remaining portion of the working stroke to crimp the rim 18 over to the position shown at 18a in Fig. 3.

I have found from experience that for nuts of a size such that the diameter of the rim 18 is of the order of ½ to ¾" satisfactory results are obtainable with the punch heated to a temperature of around 500° F. and with the contour and speed of operation of the cam or other mechanism for actuating the punch made so that the period of dwell with the punch in contact with the work is of the order of one-half a second, it being understood, of course, that the portions of the working stroke prior to and following the dwell are as rapid as may be feasible for the particular machine in which the punch is mounted. It will further be understood that in any such machine suitable feeding and ejecting mechanisms of known character will be provided for handling the pieces to be assembled.

The invention obviously may be applied with equal facility to devices of many different specific configurations such as anchor nuts and other devices characterized by the provision of a rim required to be closed over an insert or the like and also for other types of operations requiring the deformation of material which is essentially magnesium. It also will be apparent that the present invention provides a new and highly advantageous product heretofore not available and having a weight very much less than that of any product heretofore produced for performing the same function.

The invention is accordingly to be understood as embracing all novel structures, methods or apparatus defined by the appended claims.

What is claimed:

1. The method of making a threaded self-locking fastening device which comprises forming a body of metal consisting essentially of magnesium having a threaded portion and a recess at one end of the threaded portion, forming a locking element of non-metallic elastic material incapable of resisting temperatures ordinarily required for the hot-working of metal, and which provides a surface for the impression of a thread by a co-operating threaded member, placing said element in said recess, heating a portion of said body to a temperature insufficient to injure the material of said element and bending the heated portion over said element to fix the same in said recess.

2. A threaded self-locking fastening device comprising a body of metal consisting essentially of magnesium and having a threaded portion and a recess at one end of the threaded portion for the reception of a locking element, a locking element in said recess, said element consisting of non-metallic elastic material incapable of resisting temperatures ordinarily required for the hot-working of metal and having a surface located to be traversed by and have a thread impressed therein by the thread of a cooperating threaded member, said body having an integral retaining portion on the side of said element remote from said threaded portion of the body, said retaining portion being formed of metal heated to a temperature insufficient to injure the material of the locking element and bent thereover to fix the latter in place.

VEYNE V. MASON.